J. E. Daniels,
Sheep Shearing Table.
No. 86,736. Patented Feb. 9, 1869.
Fig: 1.
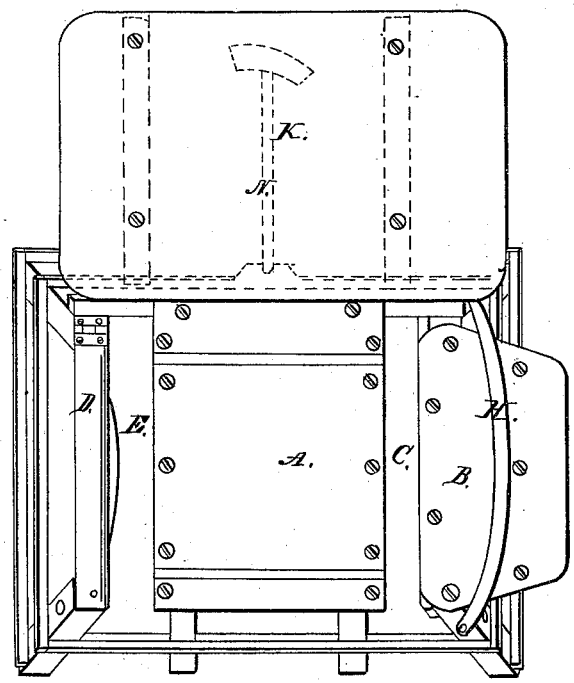
Fig: 2.
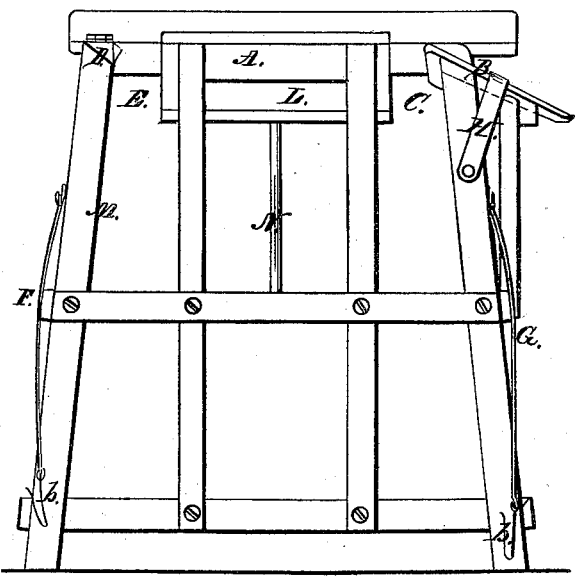
Witnesses.
J. B. Turchin
N. R. Humber
Inventor.
James E Daniels

United States Patent Office.

JAMES E. DANIELS, OF PLEASANT PRAIRIE, WISCONSIN, ASSIGNOR TO HIMSELF, H. H. DOOLITTLE, AND N. D. EDWARDS.

*Letters Patent No. 86,736, dated February 9, 1869.*

IMPROVEMENT IN SHEEP-SHEARING TABLE.

The Schedule referred to in these Letters Patent and making part of the same.

*To all whom it may concern:*

Be it known that I, JAMES E. DANIELS, of Pleasant Prairie, in the county of Kenosha, and State of Wisconsin, have invented certain new and useful Improvements in "Sheep-Shearing Table;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 is the plan, and

Figure 2, the side elevation of the table.

The nature of my invention consists in the sheep-shearing table so arranged that it secures and supports the body of the sheep comfortably, without giving any rest to the legs, and therefore keeps the sheep under entire control of the shearer during the shearing-operation.

M is a frame, suitably arranged to support the table.

A is the bed for the sheep to lie in. It is curved so as to accommodate the body of the animal comfortably.

B is the neck-rest, curved also and slanting outside, to which the neck of the animal is strapped by the strap H.

C is a space between A and B, for the sheep's fore legs to pass through.

D is a hip-rest, and

E is a space between A and D, for the hind legs to pass through.

The hip-rest is hinged to the frame at one end, and is adjustable at the other end, so that it can be raised, after the sheep is sheared, for the purpose of bringing the sheep to the ground.

F and G are straps secured to the frame, and provided with hooks, *f f,* for the purpose of catching the fore and hind legs on the same side of the sheep, when this is turned on its back, with its legs up, to shear its belly, and thus securing the legs and spreading out the sheep so as to smooth the skin of the belly.

H is a strap, secured to the frame at one end, and buttoned or buckled to the frame at the other end, that passes over the neck of the sheep, and keeps it secured to the table.

K is the table to receive the fleece, and

L is a drawer, to put in the shears and a whetstone.

Table K is folding, and is supported by leg N.

The operation consists in this, that the sheep is laid on the table with its side resting on the bed A, the neck and head on the neck-rest B, and the hip or back resting on the hip-rest D, the legs being turned to the fleece-table K, and hanging through the spaces C and E, the shearer standing in front of the table. Then the neck is strapped to the table, the sheep is placed on its back, and one fore and one hind leg are hooked by the straps F *f* G, so as to spread out the sheep and smooth the skin on the belly. After the belly is sheared, the hooks are unhooked, and the sheep is rolled over toward the shearer, and its upper side is sheared. Then the sheep is rolled over on the other side, always toward the shearer, and the other side is sheared also. Then the neck is unstrapped, the hip-rest is raised, and the sheep brought to the ground.

The advantages of my table are that the sheep is quietly and safely lying on the table while the shearing-operation is performed, and it does not require any skilful shearer to operate upon a sheep. Besides, the fleece is better preserved, and is received in perfect condition.

What I claim as my invention, and desire to secure by Letters Patent, is—

1. The sheep-shearing table, consisting of bed A, neck-rest B, and hip-rest D, or other equivalent supports or rests, spaced so as to accommodate the legs of the sheep to pass between them, each of the parts constructed as described, and the whole arranged and operating substantially as herein set forth and specified.

2. In combination with the above, the hooks on straps F and G, strap H, fleece-receiving table K, and drawer L, substantially as set forth, and for the purpose specified.

JAMES E. DANIELS.

Witnesses:
J. B. TURCHIN,
N. K. KROEBER.